(12) United States Patent
Fine et al.

(10) Patent No.: US 12,256,468 B2
(45) Date of Patent: Mar. 18, 2025

(54) METHOD AND SERVER FOR PUSHING DATA TO MNO

(71) Applicant: THALES DIS FRANCE SAS, Meudon (FR)

(72) Inventors: Jean-Yves Fine, Marseilles (FR); Frederic Dao, Marseilles (FR)

(73) Assignee: THALES DIS FRANCE SAS, Meudon (FR)

( * ) Notice: Subject to any disclaimer, the term of this patent is extended or adjusted under 35 U.S.C. 154(b) by 357 days.

(21) Appl. No.: 17/797,127

(22) PCT Filed: Feb. 1, 2021

(86) PCT No.: PCT/EP2021/052307
§ 371 (c)(1),
(2) Date: Aug. 3, 2022

(87) PCT Pub. No.: WO2021/156204
PCT Pub. Date: Aug. 12, 2021

(65) Prior Publication Data
US 2023/0057543 A1 Feb. 23, 2023

(30) Foreign Application Priority Data
Feb. 5, 2020 (EP) .................................... 20305102

(51) Int. Cl.
*H04W 8/24* (2009.01)
*H04W 8/20* (2009.01)

(52) U.S. Cl.
CPC ............. *H04W 8/245* (2013.01); *H04W 8/20* (2013.01)

(58) Field of Classification Search
CPC ................................ H04W 8/20; H04W 8/245
See application file for complete search history.

(56) References Cited

U.S. PATENT DOCUMENTS

2017/0142121 A1   5/2017   Lee et al.

FOREIGN PATENT DOCUMENTS

| EP | 3565289 A1 | 11/2019 |
|---|---|---|
| WO | 2019136044 A1 | 7/2019 |

OTHER PUBLICATIONS

International Search Report (PCT/ISA/210) and Written Opinion (PCT/ISA/237) mailed on Feb. 17, 2021, by the European Patent Office as the International Searching Authority for current International Application No. PCT/EP2021/052307—[20 pages].

(Continued)

*Primary Examiner* — Nader Bolourchi

(57) ABSTRACT

Provided is a method for pushing data to a mobile network operator (MNO), the method being suitable to be implemented by a server and comprising the following steps of: receiving, from the MNO, a message comprising at least one communication pattern associated with at least one device identifier identifying a type or a provider of a device; receiving, from a user, a request for downloading a subscription profile of the MNO; sending, in response to the request, the subscription profile to a device of the user; identifying, from the at least one communication pattern, a communication pattern applicable to the subscription profile according to device data obtained from the request; and pushing data comprising an identifier of the subscription profile and the applicable communication pattern to the MNO.

12 Claims, 2 Drawing Sheets

(56) References Cited

OTHER PUBLICATIONS

Gsm Association: 11GSM Association—Non-confidential Official Document SGP.02—Remote Provisioning Architecture for Embedded UICC Technical Specification Remote Provisioning Architecture for Embedded UICC Technical Specification Security Classification: Non-confidential GSM Association Non-confidential Official Documen, Feb. 25, 2019 (Feb. 25, 2019), XP055701886, Retrieved from the Internet: URL:https://www.gsma.com/newsroom/wp-content/uploads/SGP.02-v4.0.pdf.

& Gsm Association: "GSMAssociation Non-confidential Official Document SGP.01—Embedded SIM Remote Provisioning Architecture Embedded SIM Remote Provisioning Architecture Security Classification: Non-confidential GSM Association Non-confidential Official Document SGP.01 Embedded SIM Remote Provisioning Architecture"—Feb. 25, 2019 (Feb. 25, 2019), XP055701901, Retrieved from the Internet: URL:https://www.gsma.com/newsroom/wp-conte nt/uploads//SGP.01-v4.0.pdf [retrieved on Jun. 5, 2020]—pp. 39-42.

| Communication Pattern | TAC or Service Provider ID |
|---|---|
| - Smart Metering | - EDF |
| - Automotive | - BMW |
| - Normal user | - 35925406 (tac iphone6) |
| - Normal user | - 35744105 (tac smg s4) |

| Communication Pattern attributes |
|---|
| -ID |
| - periodicCommunicationIndicator |
| - CommunicationDurationTime |
| - stationaryIndication |
| - .... |

Fig. 3

| Communication Pattern ID | Subscription ID or Group ID | Service Provider to notify |
|---|---|---|
| - Smart Metering | - IMSI 1 | - credentials+URL for EDF |
| - Automotive | - IMSI 2 | - credentials+URL for BMW |
| - .... | | .... |

Fig. 4

METHOD AND SERVER FOR PUSHING DATA TO MNO

TECHNICAL FIELD

The present invention generally relates to a method and server used in a telecommunications network. It relates particularly to a method and server for pushing data to a mobile network operator.

BACKGROUND

It is known that a mobile network operator provides a remote SIM (i.e. "subscriber identity module") provisioning service allowing a customer to download a subscription file remotely from a Subscription Manager Data Preparation (namely, SM-DP or SM-DP+) server into an embedded Subscriber Identity Module (SIM) (also known as an embedded universal integrated circuit chip eUICC) which may be soldered inside a communication device of the customer. The SM-DP or SM-DP+ is responsible for preparing, storing and protecting subscription files.

Customers of an operator could be end users and/or Machine to Machine (M2M) or Internet of Things (IoT) service providers. These service providers are for example Smart Metering providers, automotive constructor, etc.

Nowadays, operators have to associate in their core network a specific communication pattern with each subscription downloaded by a customer (or subscriber)'s device. A communication pattern includes a data plan and determines how the customer's device will use his subscription to communicate with a network of the operator. For example, according to Annex A.10 of Third Generation Partnership Project (3GPP) Technical Specification (TS) 29.122, a communication pattern comprises attributes identifying (or defining) whether a user equipment (UE) communicates periodically or on demand, duration time of periodic communication, interval time of periodic communication, time zone and day of the week when the UE is available for communication, etc.

However, the existing solution for the operators to associate the communication patterns with the subscriptions in their core-network has drawbacks. Since each subscription should be associated with a specific communication pattern according to the specific need of each customer, the operator has to establish several subscription pools, each pool containing subscriptions to be downloaded for a specific type of customers. Each time a customer requests a subscription from the operator, the latter has to check the type of the customer, identify a specific subscription pool corresponding to the customer in order to select an applicable communication pattern suitable for the customer's subscription. The operator also needs to maintain and monitor the several subscription pools. Thus, requesting new subscriptions could take time. The existing solution is complicated, inefficient and expensive for the operators to implement.

There is a need for a solution that enables the operators to manage communication patterns efficiently when they receive subscription requests from their customers.

SUMMARY

In order to solve the above mentioned technical problem, the present invention provides a method and a server for pushing data to a mobile network operator.

According to a first aspect of the invention, there is provided a method for pushing data to a mobile network operator MNO, the method being suitable to be implemented by a server and comprising the following steps of:
  receiving, from the MNO, a message comprising at least one communication pattern associated with at least one device identifier identifying a type or a provider of a device;
  receiving, from a user, a request for downloading a subscription profile of the MNO;
  sending, in response to the request, the subscription profile to a device of the user;
  identifying, from the at least one communication pattern, a communication pattern applicable to the subscription profile according to device data obtained from the request; and
  pushing data comprising an identifier of the subscription profile and the applicable communication pattern to the MNO.

According to a second aspect of the invention, there is provided a server for pushing data to a mobile network operator MNO, the server being configured to:
  receive, from the MNO, a message comprising at least one communication pattern associated with at least one device identifier identifying a type or a provider of a device;
  receive, from a user, a request for downloading a subscription profile of the MNO;
  send the subscription profile to a device of the user in response to the request;
  identify, from the at least one communication pattern, a communication pattern applicable to the subscription profile according to device data obtained from the request; and
  push data comprising an identifier of the subscription profile and the applicable communication pattern to the MNO.

In this document, a device identifier refers to an identifier identifying a type of a device (e.g. Type Allocation Code (TAC) for iPhone 6, TAC for Samsung s4, etc.), or a provider of a device (e.g. service provider ID like Electricite de France (EDF), Bayerische Motoren Werke (BMW), etc.).

Herein, a subscription profile, also called SIM profile or operator profile or subscriber profile, refers to a data file comprising operator and subscriber data related to a subscription (e.g. International Mobile Subscriber Identity IMSI, Integrate circuit card identity ICCID, etc.).

This profile comprises operator's credentials (e.g. cryptographic keys) and potentially operator or third-party SIM based applications (e.g. security algorithms, etc.).

Such a subscription file is known to be downloaded and installed in a secure element (e.g. eUICC) of a user's device to allow the device to use a network of the operator.

A communication pattern herein refers to a data plan or a set of rules determining how a user's device will use his subscription to communicate with a network of the operator.

For example, a predetermined frequency of connection to the network, a predetermined communication period duration per day/week/month over the network, a predetermined data volume per day/week/month over the network, etc.

For example, the communication pattern contains pattern attributes as described in std CpParameterSet of 3GPP TS 29.122 as mentioned above.

The present invention advantageously enables the operator to maintain only one generic subscription pool containing subscriptions for all kinds of subscribers, instead of multiple pools corresponding to different types of users.

The invention allows for the operator to delegate the task of identifying communication patterns applicable to different users to the server which is also responsible for receiving subscription download requests and allocating the requested subscriptions.

In other words, the allocation of the subscription files and the identification of the communication patters suitable for the allocated subscription files are performed advantageously in a centralized manner by the same entity, i.e. the server implementing the method according to the invention.

In an embodiment, the server may be a SM-DP server or SM-DP+ server. The invention thus provides a new SM-DP (+) server that is capable of managing communication patterns for the operators.

This solution greatly improves the efficiency of the remote SIM provisioning process and simplifies the operator's system complexity related to this process.

Moreover, the invention advantageously allows for a third party (e.g. a manufacturer of the server) to offer a service for managing the communication patterns for the operators.

Herein, a user may refer to a service provider (e.g. IoT or M2M service provider) or an end user. As known, a service provider owns a plurality of connected objects such as smart meters, smart vehicle sensors, etc. An end user refers to a person who ultimately uses or is intended to ultimately use a device.

In a particular embodiment, the user may be a service provider. The message received from the MNO comprises a service provider identifier (e.g. credentials, username/password pair, keys, etc.) associated with the at least one communication pattern. The device data obtained from the request may be a service provider identifier.

In a particular embodiment, the user requesting the subscription profile may be an end user. The message received from the MNO comprises a Type Allocation Code TAC associated with the at least one communication pattern. The device data obtained from the request may be a TAC.

In a particular embodiment, the method further comprises steps of:
  registering to the MNO to receive event information related to the subscription profile;
  receiving the event information from the MNO;
  verifying, according to the event information, whether the device downloading the subscription profile respects the communication pattern identified for the subscription profile;
  sending to the user a notification if it is verified that the device does not respect the communication pattern.

Herein, event information refers to information on events relating to a usage of the subscribed network by the device. The events may be, for example, communication period duration per day/week/month over the network, connection frequency per day/week/month over the network, data flow volume used per day/week/month, etc.

The invention thus advantageously allows to verify if the communication pattern is still relevant based on the events received.

A notification or an alert may be sent to the user, for example a service provider, if one or several of the subscriptions are not using the correct MNO communication pattern (i.e. the communication pattern previously identified and pushed for the downloaded subscription profile). In a variant, a notification may be sent to an end user.

The invention enables the user to be aware of the usage status of their subscriptions without necessity of consulting the operator on his own. This is especially advantageous when the user has a plurality of subscriptions of different operators in his device.

In a particular embodiment, the method further comprises steps of:
  identifying, according to the event information, one or more communication patterns that are suitable for the device to use;
  sending to the user the one or more communication patterns;
  receiving from the user a communication pattern selected by the user;
  pushing the selected communication pattern with the identifier of the subscription profile to the MNO.

This embodiment advantageously provides a great flexibility to the users in managing and modifying his communication patterns. The invention enables to analyze the user's usage of the current communication pattern and recommend more suitable communication patterns to the users for them to choose. This will help reducing consumption and billing overhead for the users, for example, the service providers, if the current communication pattern usage is not as expected for some of their subscriptions.

In a particular embodiment, a plurality of communication patterns applicable to the subscription profile are identified, and wherein the method further comprises steps of:
  sending the plurality of communication patterns to the user;
  receiving a communication pattern selected by the user from the plurality of communication patterns;
  Wherein the selected communication pattern is pushed with the identifier of the subscription profile to the MNO.

In a particular embodiment, wherein the method further comprises steps of:
  Before receiving from the MNO the message comprising the at least one communication pattern, sending to the MNO one or more communication patterns offers;
  receiving from the MNO the message comprising the at least one communication pattern which is selected from the one or more communication patterns offers.

In a particular embodiment, wherein the identifier (e.g. IMSI) of the subscription profile and the applicable communication pattern are pushed to a network exposure function NEF platform of the MNO.

NEF is known to be related to the 3GPP 5G Architecture. This function provides a means to securely expose the services and capabilities provided by 3GPP network functions. The NEF enables external exposure capabilities of network functions for supporting Monitoring, Provisioning and Policy/Charging. The network capability exposure comprises: (i) Exposure of network events externally as well as internally towards core network NFs; (ii) Exposure of provisioning capability towards external functions; (iii) Exposure of policy and charging capabilities towards external functions; and (iv) Exposure of core network internal capabilities for analytics.

Based on operator configuration NEF may perform bulk subscription with the Network Functions that provides necessary services. The NEF also supports security when services or Application Functions access 5G Core nodes. In essence, it behaves like a proxy or API aggregator for the core.

The invention thus advantageously allows the MNO's core network to securely receive, via the NEF, the identifier of the downloaded subscription and the communication pattern suitable for (or applicable to) that subscription in order to associate the subscription with the communication pattern in the core network.

The advantages and features of the server according to the embodiments of the present invention are the same with those of the above described method and will not be repeated here.

In a particular embodiment, the steps of the method for pushing data to a mobile network operator are determined by computer program instructions.

Consequently, according to a third aspect, the invention is also directed to a computer program for executing the steps of the method for pushing data to a mobile network operator as described above when this program is executed by a processor.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the support can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 3 illustrates exemplary content of a message received by the server 11 from the MNO of FIG. 1.

FIG. 4 illustrates exemplary content of an alerting list used by the server 11 to send notifications to the service provider of FIG. 1.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
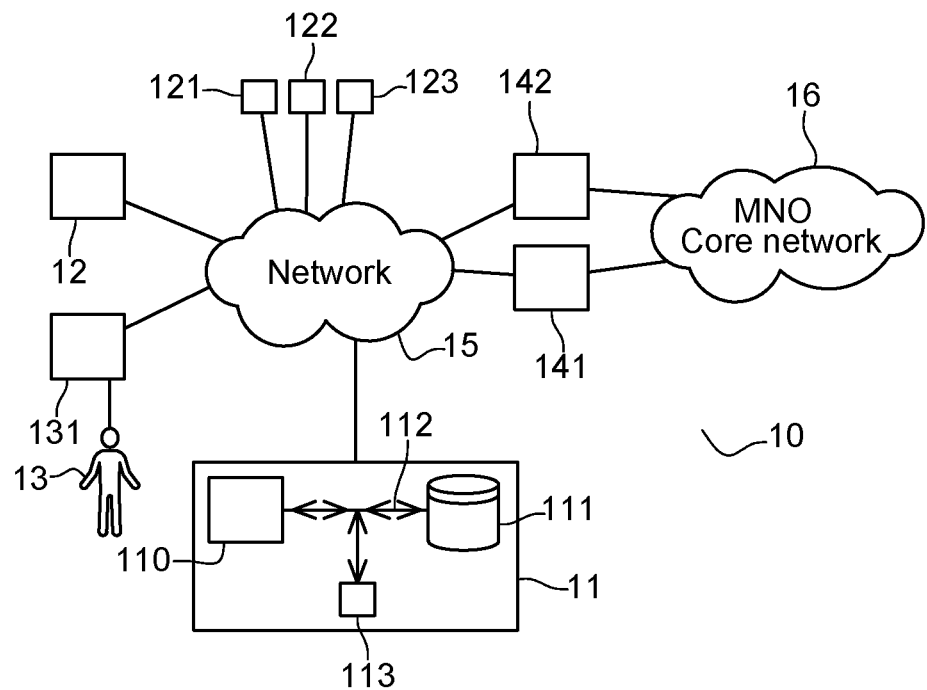
FIG. 1 illustrates a simplified diagram of a system comprising, among others, a server for pushing data to a mobile network operator, according to an exemplary embodiment of the invention.

FIG. 1 shows schematically a system 10 comprising a server 11 for pushing data to a mobile network operator, a device 12 and one or more terminals 121, 122, 123 of a service provider, a terminal 131 of an end user 13, and one or more devices 141, 142 of the mobile network operator. The devices 141, 142 may be considered to be at the MNO's side as they are linked to the MNO's core network 16.

For sake of simplicity, only one service provider, one end user, and one mobile network operator are represented in FIG. 1. However, it is clear that the system 10 may comprise multiple service providers, multiple end users, and multiple mobile network operators. The server 11 is able to push data to the multiple MNOs.

The entities 12, 121-123, 131, and 141-142 of the system 10 communicate with each other via a wired or wireless telecommunications network(s) 15. The network(s) 15 may include a Global System for Mobile communications (or GSM), a General Packet Radio Service (or GPRS), a Universal Mobile Telecommunications System (or UMTS), a Code Division Multiple Access (or CDMA) and/or a Long Term Evolution (or LTE) type network(s).

Alternatively or additionally, the network(s) 15 may include an internet type network accessible possibly, via Contactless (or CTL) links, through an intermediate entity (ies), like e.g. a Network Access Point (or NAP) (now shown). Herein, the adjective "CTL" used in the term "CTL links" refers to notably one or several Short Range (or SR) Radio Frequency (or RF) links. The SR RF may be related to a Near Field Communication (or NFC) type, Bluetooth type or Wi-Fi type technology. Such a set of technology types is not exhaustive. Such a SR RF link may be used for exchanging data at an SR distance typically from around 20 cm (such as with an NFC type technology) to around 800 m (such as with a Bluetooth or Bluetooth Low Energy (or BLE) type technology). The SR RF link may be fixed, for instance, at 13.56 Mhz for NFC with a range up to around 20 cm, at 2,4-2.5 GHz with a range of about 10 m to about 100 m (for Zigbee, e.g. IEEE 802.15.1, Wifi and Bluetooth or BLE, e.g. IEEE 802.15.1), from around 2.4 GHz to around 10 GHz (for Ultra-Wide Band (or UWB), e.g. IEEE 802.15.4a).

The telecommunications network set is not exhaustive but only for exemplifying purposes.

The terminals 121-123 and 131 may include, for example, a mobile phone, a portable device, such as a handheld computer, like a personal Digital Assistant (or PDA), a palm-top computer, a Personal Computer (or PC), a Voice Over Internet Protocol (or VOIP) handset, a netbook, a tablet, a set-up box, a media player, a game console, a TeleVision (or TV) set, a machine of an M2M device, such as a vehicle computer, and/or an IoT device.

In the example of FIG. 1, the terminals 121-123 are M2M devices, and the terminal 131 is a smart phone. The device 12 is, e.g. a server or control device of the service provider, adapted to book a subscription for a M2M device, e.g. one of the terminals 121-123, at the server 11 via a gateway (not shown in FIG. 1), e.g. Subscription Manager Secure Routing (or SM-SR). The SM-SR may be implemented within the SM-DP or external to the SM-DP.

Each of the terminals 121-123 and 131 includes a chip (e.g. eUICC) incorporated, in a removable or fixed manner, within a Printed Circuit Board (or PCB) of the terminal.

The terminal 131 may request downloading a subscription file(s) from the server 11 via the network 15. The terminals 121-123 may request subscription files directly from the server 11. Alternatively, the device 12 may request subscription files for the terminals 121-123 via the network 15. The terminals 121-123 and 131 are adapted to install the downloaded subscription files in their chips.

The server 11 may be an Over-The-Air (or OTA), an Over-The-Internet (or OTI) and/or an Over The Cloud (or OTC) server. The server is for example a SM-DP or a SM-DP+ server.

The server 11 may be operated or managed by an MNO, a Mobile Network Virtual Operator (or MNVO) and/or on its behalf, as a data pushing service provider.

The server 11 is preferably hosted by a computer with one or more processors and/or controllers, as data processing means 110, one or more memories 111, and one or more Input/Output (or I/O) interfaces 113 that are linked all together through a control and data bus 112.

Each of the server 11, the devices 12 and 141-142, the terminals 121-123 and 131 is identified by a Uniform Resource Identifier (or URI), a Uniform Resource Locator (or URL), an email address and/or an Internet Protocol (or IP) address.

The memory(ies) 111 may be implemented as a database storing subscription profiles to be provided to (or downloaded by) at least some of the terminals 121-123 and 131. This database may be considered to be a single pool of generic subscriptions for a particular MNO because the subscription profiles stored therein are not classified into different groups, for example, according to different user types. The pool of generic subscriptions may be considered to be dynamic because new subscription profiles may be provisioned therein and used subscription profiles may be removed therefrom. In a variant, the database may comprise several groups (or pools) of subscription profiles for multiple MNOs, each group being dedicated for subscription profiles of one particular MNO.

The memory(ies) 111 may store one or more communication patterns received from the MNO.

The server 11 is adapted to receive a message comprising at least one communication pattern associated with at least one device identifier from a device, e.g. the device 141, of the MNO. FIG. 3 illustrates exemplary content of the message received by the server 11 from the device 141 of the MNO.

In an example, the communication pattern may include a communication pattern identifier (e.g. a name such as "Smart Metering", "Automotive", "Normal (or End) User", etc.), and one or more communication pattern attributes (e.g. attribute ID, periodic communication indicator, communication duration time, stationary indication, etc.) corresponding to the communication pattern identifier.

The device identifier is used to indicate the type of a device (e.g. TAC for iPhone 6, TAC for Samsung s4, etc.), or the provider of a device (e.g. service provider ID like EDF, BMW, etc.).

It should be noted that the message received from the MNO may comprise a plurality of device identifiers, each device identifier being associated with one or more communication patterns.

The server 11 is able to receive one or more such messages from multiple MNOs.

The memory(ies) 111 may store the communication pattern(s) and the associated device identifier(s) received from the MNO.

As known in the existing remote SIM provisioning mechanism, there are two known main exemplary use cases as below that allow a user's device to request a subscription profile from an MNO. These use cases are briefly introduced in the description in order to explain how the existing remote SIM provisioning system performs provisions a user's device with a subscription profile. They are not essential features of the invention. It should be noted that some variants of these use cases exist in the prior art and the invention is not limited by the following two exemplary use cases.

In the first exemplary use case, called "consumer mode" according to the GSMA standard, when an end user sets up a contract with his chosen MNO, the MNO books a subscription at a SM-DP+ server for the end user. The MNO receives from the SM-DP+ server an ID of Transaction and then sends a QR code containing the Transaction ID to the end user's device. Then the end user scans the QR code with an application (called Local Profile Assistant or LPA in the GSMA standard) installed in his device. The scanning of the QR code triggers the end user's device to connect to the SM-DP+ server and to send a request to the SM-DP+. The request contains the Transaction ID so that the SM-DP+ server knows which subscription is required by the end user's device. The request also contains the IMEI/Tac of the device.

In the second exemplary use case, called "M2M mode" by the GSMA standard, when a service provider (or SP) sets up a contract with his chosen MNO, the SP sends a request (containing the SP's credentials) to a SM-DP server via a Subscription Manager Secure Routing (or SM-SR) server as a gateway between the SP and the SM-DP, to book a subscription for a M2M device. Then, SM-SR sends to the M2M device an SMS containing data which triggers an eUICC of the M2M device to connect to the SM-SR and download the subscription.

In the example of FIG. 1, the server 11 is configured to receive, directly from a user's device (e.g. the end user's terminal 131) a request for downloading a subscription profile of the MNO, as in the "consumer mode".

The server 11 is also adapted to receive, indirectly from a user's device (e.g. the service provider's device 12) via a gateway (e.g. Subscription Manager Secure Routing or SM-SR between the device 12 and the server 11, the SM-SR is not shown FIG. 1), a request for downloading a subscription profile of the MNO.

The subscription profile may comprise:
- an IMSI or the like, as a subscriber and a (service) subscription identifier for accessing a network(s);
- a key Ki, as a Network Authentication Key (or NAK), allowing to authenticate the concerned subscriber to the concerned network(s);
- Milenage or the like, as a network authentication algorithm, allowing to authenticate the concerned subscriber to the concerned network(s);
- a file system including one or more Elementary Files (or EF);
- one or more security keys, such as a key(s) for enciphering/deciphering data and/or a key(s) for signing data, and/or a key(s) as secret data;

one or more credentials, such as a user name and/or an IDentifier (or ID) of the subscriber, as data relating to the subscriber.

The server 11 is able to receive multiple subscription requests from a user's device.

The server 11 is adapted to send the requested subscription profile(s) to a device of the requesting user. Similarly to the receiving process, the server 11 is able to send the requested subscription profile directly to a user's device (e.g. the end user's terminal 131), as in the "consumer mode".

The server 11 is also adapted to send the requested subscription profile indirectly to a user's device (e.g. the service provider's M2M device 121, 122 or 123) via the gateway (e.g. SM-SR).

The server 11 is configured to identify, from the received communication pattern(s), one or more communication patterns applicable to (or suitable for) the requested subscription profile according to device data obtained from the request. The term "applicable to/suitable for" used herein means that the applicable (or suitable) communication pattern has an associated device identifier which matches the device data obtained from the request.

The device data may comprise data indicating the type of the device and/or the provider of the device. For example, the device data may be a TAC, or a Service Provider ID, etc. The TAC may be extracted by the server 11 from the International Mobile Equipment Identity (or IMEI) included in the request by the requesting device (e.g. terminal 121-123, 131). The Service Provider ID may be included in the request by the device, for example, the device 12 of the service provider when sending the request.

The memory(ies) 111 may store the device data at least temporally.

The server 11 is adapted to push data comprising an identifier (e.g. IMSI) of the subscription profile and an identifier (e.g. the communication pattern name, reference, etc.) of the applicable communication pattern or the complete applicable communication pattern to the MNO. For example, the identifier of the subscription profile may be included in the request by the user's device (e.g. the service provider's device 12) and obtained by the server 11 when receiving the request. Alternatively, the identifier of the subscription profile may be found by the server 11 based on data (e.g. Transaction ID) included in the request by the user's device (e.g. the end user's terminal 131).

In the example of FIG. 1, the server 11 pushes the data to the device 142 of the MNO. The device 142 may be a NEF platform which may be in charge of associating subscribers' subscriptions with communication patterns. Alternatively, the server 11 may push the data to the device 141 or any other entities of the MNO.

Figure 2:
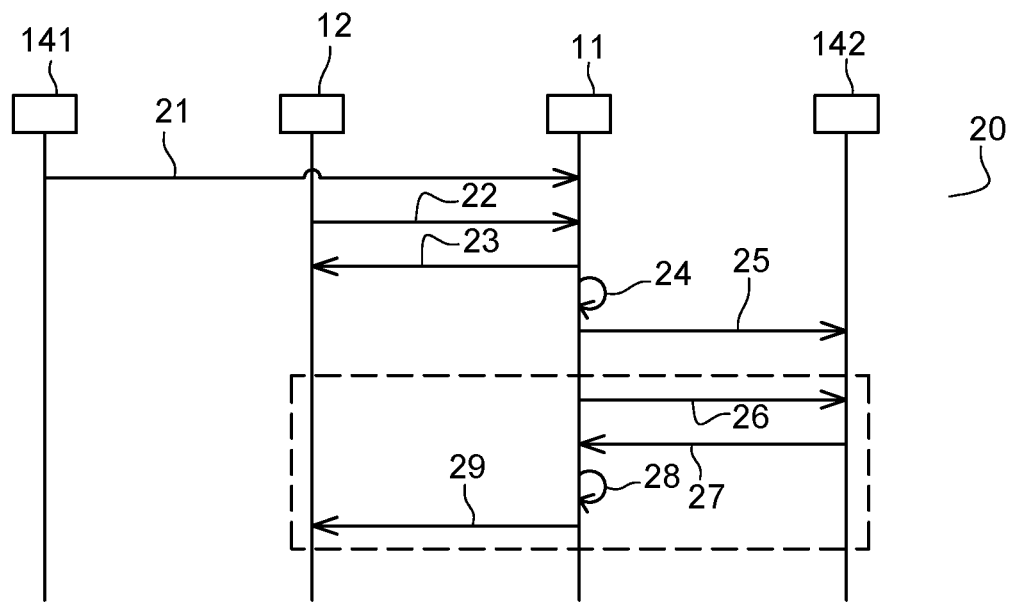
FIG. 2 represents a flow chart of a method for pushing data to a mobile network operator suitable to be implemented by the server 11 of FIG. 1, according to an exemplary embodiment of the invention.

FIG. 2 depicts an exemplary embodiment of a method flow 20 that involves principle steps that performed notably by the server 11, the device 12 of the service provider, and the devices 141, 142 of the MNO.

In the example of FIG. 2, it is assumed that the devices 141 and 142 of the MNO are different entities. Alternatively, the devices 141 and 142 may be the same entity.

In this embodiment, the server 11 exposes an Application Program Interface (or API) or the like, as an entry point, to the device 141 of the MNO to receive a message related to communication patterns, in step 21.

This API may be an extension of the existing ES2, ES2+ (consumer mode) or ES4 (exposed by SM-SR in M2M mode) interface. The MNO may thus use this new API to provision the server 11 with communication patterns associated with device identifiers.

As mentioned above, the message received by the server 11 from the device 141 of the MNO may contain communication pattern attributes ((e.g. attribute ID, periodic communication indicator, communication duration time, stationary indication, etc.) associated with device identifiers such as TAC and/or Service Providers ID, etc.

Optionally, the server 11 may expose, to e.g. the device 12 and terminals 121-123 of the service provider, an API to choose one communication pattern available from the MNO.

Optionally, the server 11 may expose, to e.g. the device 141 and/or 142 of the MNO, an API to propose communication pattern offers. In other words, in another embodiment, the server may send, on this initiative, to the MNO one or more communication pattern offers (e.g. proposed communication pattern(s) for different types of devices and/or different service providers' devices) for the MNO to choose. The server 11 may receive, in step 21, the communication pattern(s) with the corresponding device identifiers (e.g. TAC, Service Provider ID) selected by the MNO.

In the embodiment of FIG. 2, when the server 11 receives, in step 22, a request for a subscription file from the device 12 of the service provider. At this moment, a new subscription download is starting between the server 11 and the device 12. In another embodiment, the server 11 may receive the request from any one of the terminals 121-123 and 131.

The download request comprises the Service Provider ID of the service provider that originally requested the download. In another embodiment, the download request may comprise an IMEI of the requesting terminal 121, 122, 123 or 131.

In step 23, the server 11 sends the requested subscription file to the device 12 for the latter to forward the subscription file to one or more of the terminals 121-123. In another embodiment, the server 11 may send the requested subscription file to the requesting terminal 121, 122, 123 or 131.

The sending of the requested subscription file indicates that a successful download ends.

In step 24, the server 11 identifies, among the one or more communication patterns associated with the device identifiers (e.g. TAC, Service Provider ID, etc.) provided by the device 141 of the MNO, the communication pattern applicable to the requested subscription file, e.g. the communication pattern for which the associated device identifier (e.g. Service Provider ID) matches the Service Provider ID comprised in the download request. In another embodiment, the server 11 extracts a TAC from the IMEI included in the request and finds the communication pattern's associated device identifier (e.g. TAC) corresponding to the extracted TAC.

The server 11 pushes, in step 25, data comprising the identified applicable communication pattern and an identifier (e.g. IMSI) of the subscription file to the device 142 (e.g. NEF platform) of the MNO for example via an NEF MNO API (as describe in 5G standard).

In another embodiment, the server 11 pushes the data to the device 141 or any other devices of the MNO.

The invention thus provides a way for the MNO to delegate the identification of association {IMSI-communication pattern} to the server 11 which may be SM-DP product.

The Advantages of the method comprise:
1—The MNO will have to provide only one pool with generic subscriptions.
2—SM-DP will provide an API to MNO to provision association that could be:
Service Providers credentials/Communication pattern
TAC/Communication pattern 3—After a successful download, SM-DP will notify the MNO thanks to the NEF API to associate IMSI to a communication pattern. MNO can update its core network accordingly.

By doing such, MNO has only one pool to monitor and maintain availability.

Optionally, the method also provides an alarming service mainly involving steps 26, 27, 28 and 29 as described below.

For each new subscription downloaded, the server 11 may create groups of subscriptions and put the new subscription downloaded in a specific group, for example, according to the type of users.

The server 11 registers, in step 26, to the device 142 (e.g. NEF platform) of the MNO to receive, in step 27, events related to the subscriptions of one or more groups.

Thus, as an additional service proposed by the server 11 to the Service providers, the server 11 may verify, in step 28, if the communication pattern for a specific subscription downloaded is still relevant based on the events received.

The events may comprise, as above mentioned, connection and disconnection events. The server 11 may send, in step 29 notifications to the service provider if one or several of his subscriptions does(do) not respect the communication pattern(s) pushed to the MNO. In another embodiment, the server 11 may send alerts to the end user 13 if the server 11 finds that the terminal 131 is not using the correct communication pattern.

FIG. 4 illustrates exemplary content of an alerting list used by the server 11 to send notifications to the service provider. The list records, for example, for one specific subscription or a group of subscriptions (e.g. IMSI), the current communication pattern (e.g. pattern ID) and the service provider/the end user (e.g. credentials and/or URLs) to notify.

This optional embodiment provides the server 11 with the capacity to listen to events from MNO network and verifies that the pattern is the correct one. If not the server could send alarms to e.g. the service provider indicating that the communication pattern used is not the appropriate one.

In 5G standard, servers like our SM-DP can register to events that are related to subscriptions or group of subscriptions.

Example of events that could be interesting are the events related to the connectivity notification of the terminal. Connection and disconnection information about periodicity of the communication that is part of the communication pattern.

Optionally, the server 11 identifies, among the communication patterns stored in its memory(ies) 111, one or more communication patterns that are suitable for the service provider/end user's terminal(s) according to the registered event information. The server 11 pushes the identified communication pattern(s) to the service provider or the end user to receive a communication pattern selection. The server 11 then pushes the selected communication pattern associated with the IMSI to the MNO which provide the communication pattern.

This will reduce consumption and billing overhead for the service provider or the end user if usage is not as expected for some of their subscriptions.

The invention claimed is:

1. A method for pushing data to a mobile network operator (MNO), the method being suitable to be implemented by a server used in a telecommunications network and comprising the following steps of:

receiving, from the MNO, a message comprising at least one communication pattern associated with at least one device identifier identifying a type or a provider of a device of a user, the communication pattern being a data plan or a set of rules determining how the device of the user will use a subscription associated with the device of the user to communicate with a network of the MNO;

receiving, from the device of the user, called a first device, a request for a subscription profile of the MNO to be downloaded by another device of the user, called a second device, the request comprising device data of the second device and information enabling the server to identify the requested subscription profile and contact the second device;

sending, in response to the request, the subscription profile to the second device of the user according to said information;

identifying, from the at least one communication pattern, a communication pattern applicable to the subscription profile, said applicable communication pattern being a communication pattern having an associated device identifier which matches the device data obtained from the request; and pushing data comprising an identifier of the subscription profile and the applicable communication pattern to the MNO.

2. The method according to claim 1, wherein the user is a service provider, the at least one device identifier comprises a service provider identifier, and the device data comprises a service provider identifier.

3. The method according to claim 1, wherein the user is an end user, the at least one device identifier comprises a Type Allocation Code (TAC), and the device data comprises the TAC.

4. The method according to claim 3, wherein the method further comprises steps of:

registering to the MNO to receive event information related to the subscription profile;

receiving the event information from the MNO;

verifying, according to the event information, whether the second device respects the communication pattern identified for the subscription profile;

sending to the user a notification if it is verified that the second device does not respect the communication pattern.

5. The method according to claim 4, wherein the method further comprises steps of:

identifying, according to the event information, one or more communication patterns that are suitable for the second device to use;

sending to the user the one or more communication patterns;

receiving from the user a communication pattern selected by the user;

pushing the selected communication pattern with the identifier of the subscription profile to the MNO.

6. The method according to claim 5, wherein a plurality of communication patterns applicable to the subscription profile are identified, and wherein the method further comprises steps of:

sending the plurality of communication patterns to the user;

receiving a communication pattern selected by the user from the plurality of communication patterns;

wherein the selected communication pattern is pushed with the identifier of the subscription profile to the MNO.

7. The method according to claim 6, wherein the method further comprises steps of:
- before receiving from the MNO the message comprising the at least one communication pattern, sending to the MNO one or more communication patterns offers;
- receiving from the MNO the message comprising the at least one communication pattern which is selected from the one or more communication patterns offers.

8. A method according to claim 7, wherein the identifier of the subscription profile and the applicable communication pattern are pushed to a network exposure function NEF platform of the MNO.

9. A server for pushing data to a mobile network operator (MNO) in a telecommunications network, the server comprising:
- a processor; and
- a memory for storing instructions executable by the processor;
- wherein the processor is configured to perform a method of:
  - receiving, from the MNO, a message comprising at least one communication pattern associated with at least one device identifier identifying a type or a provider of a device of a user, the communication pattern being a data plan or a set of rules determining how the device of the user will use a subscription associated with the device of the user to communicate with a network of the MNO;
  - receiving, from the device of the user, called a first device, a request for a subscription profile of the MNO to be downloaded by another device of the user, called a second device, the request comprising device data of the second device and information enabling the server to identify the requested subscription profile and contact the second device;
  - sending, in response to the request, the subscription profile to the second device of the user according to said information;
  - identifying, from the at least one communication pattern, a communication pattern applicable to the subscription profile, said applicable communication pattern being a communication pattern having an associated device identifier which matches the device data obtained from the request; and
  - pushing data comprising an identifier of the subscription profile and the applicable communication pattern to the MNO.

10. The server according to claim 9, wherein the server is a Subscription Manager Data Preparation (SM-DP) or SM-DP+ server.

11. The server according to claim 9, comprising a computer program that provides the instructions, which when executed by the processor, results in executing steps of the method for pushing data to the MNO.

12. The server according to claim 11, comprising a recording medium readable by the processor and having recorded thereon the computer program.

* * * * *